July 10, 1934.  F. H. TREGO  1,965,677
CARRIAGE FEED MECHANISM
Filed Nov. 29, 1929   3 Sheets-Sheet 1
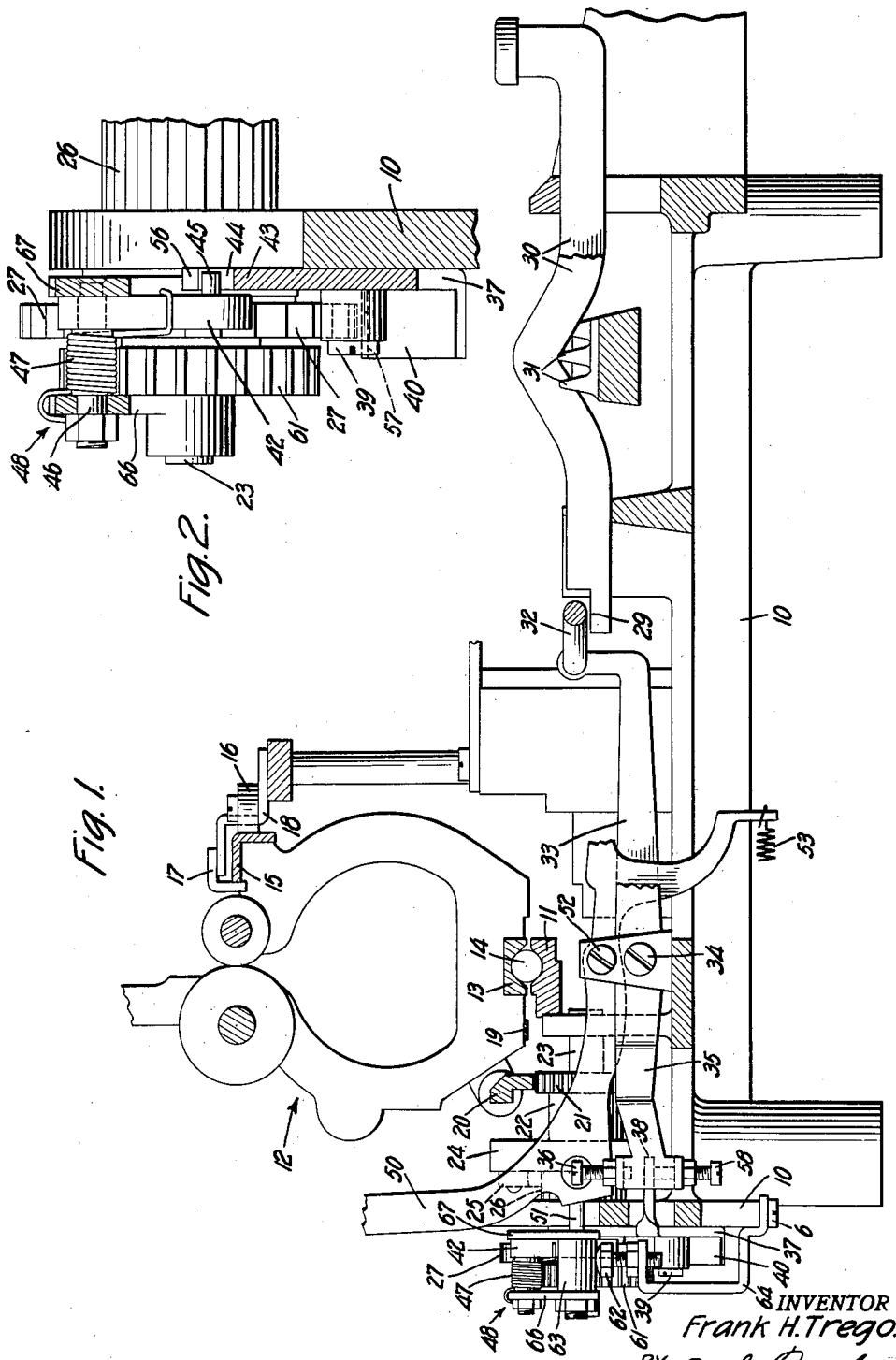
INVENTOR
Frank H. Trego.
BY John Waldheim
ATTORNEY

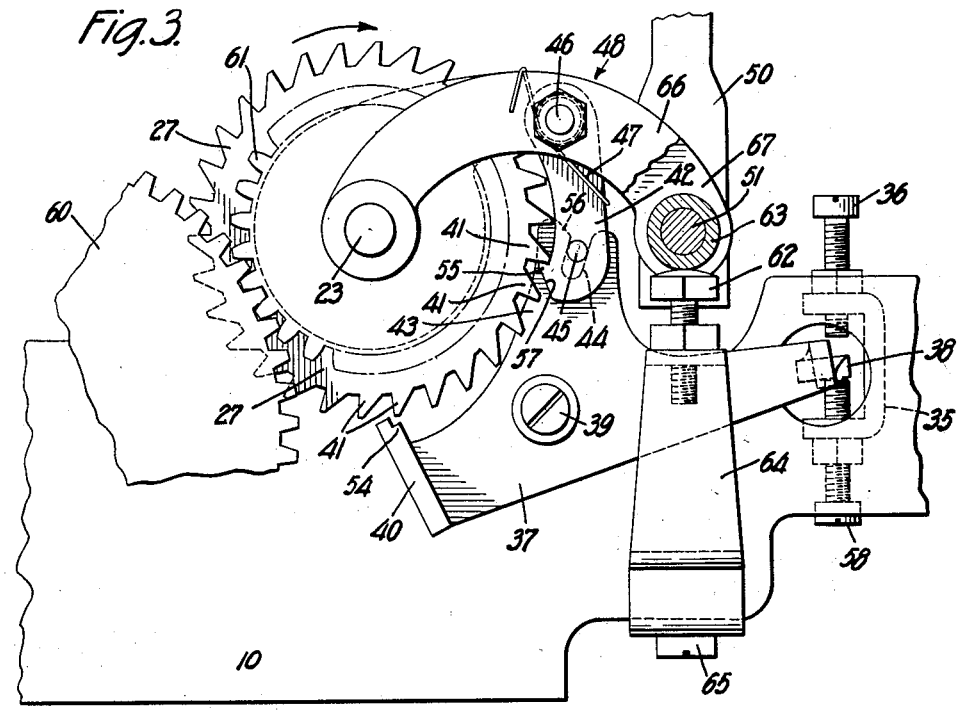
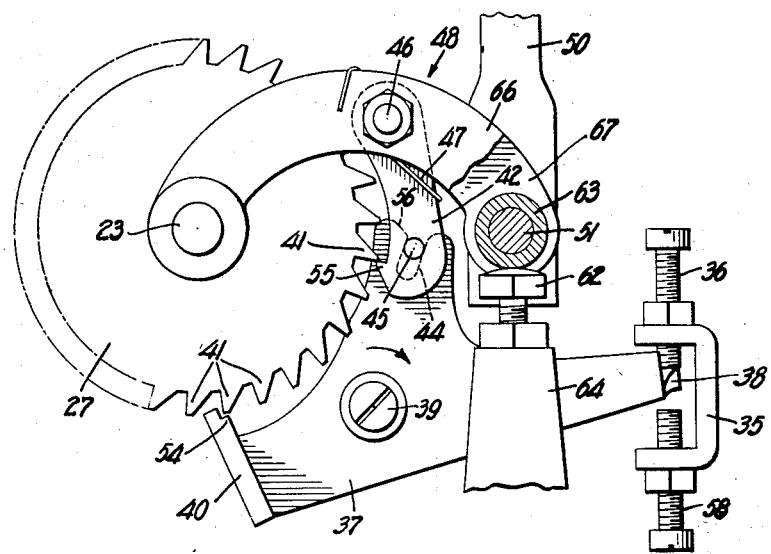

July 10, 1934.   F. H. TREGO   1,965,677
CARRIAGE FEED MECHANISM
Filed Nov. 29, 1929   3 Sheets-Sheet 3

INVENTOR
Frank H. Trego.
BY John Waldheim
ATTORNEY

Patented July 10, 1934

1,965,677

UNITED STATES PATENT OFFICE 1,965,677

CARRIAGE FEED MECHANISM

Frank H. Trego, New York, N. Y., assignor, by mesne assignments, to Ralph C. Coxhead Corporation, New York, N. Y., a corporation of Delaware Application November 29, 1929, Serial No. 410,277

8 Claims. (Cl. 197—85)

This invention relates to improvements in typewriting machines and more particularly to carriage feed mechanism therefor.

An object of the invention is to provide a substantial and efficient escapement structure with a minimum number of parts.

A feature of the invention relates to means to guide the loose dog, after its release from the escapement wheel, around the disengaged tooth to insure against contact of the loose dog with the back of said disengaged tooth while said loose dog is moving into the path of the next succeeding tooth of the escapement wheel.

Another feature of the invention relates to means on the loose dog and on the fixed dog to co-operate with the escapement wheel to limit the movements of said dog towards and away from the escapement wheel and also determine the extent of overlap between said dogs and the teeth of the escapement wheel. This arrangement not only makes the operation of the escapement more satisfactory but also eliminates the use of adjusting screws and devices used heretofore.

Another feature of the invention relates to novel means to arrest the loose-dog carrying frame in its normal position.

Other features and advantages will hereinafter appear.

In the drawings,

Fig. 1 is a sectional side view of the machine some of the parts being omitted;

Fig. 2 is a detail side view, on a larger scale, of the escapement mechanism;

Fig. 3 is a rear view of the escapement mechanism in normal position;

Fig. 4 is a view similar to Fig. 3 but shows the parts operated and at the instant the loose dog is to be disengaged from the escapement wheel, the fixed dog having been moved into the path of the escapement wheel;

Similar reference characters represent similar parts throughout the several views.

Figure 5:
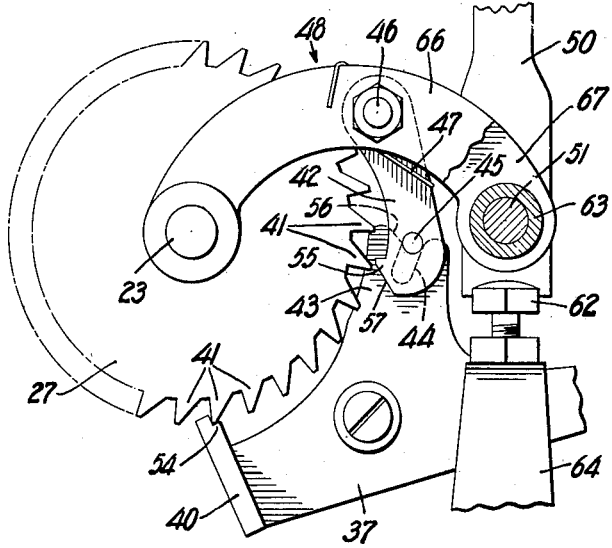
Fig. 5 shows the loose dog released and being guided around the disengaged tooth, the escapement wheel being held by the fixed dog.

The invention is shown as applied to the varityper writing machine which includes a main frame 10 having a rail 11 upon which a carriage 12 is mounted to travel back and forth; the carriage having a guide bar 13 which co-operates with the rail 11 through the medium of antifriction rollers 14. The upper part of the carriage may be guided by a bar 15 co-operating with rollers 16 and a guard 17 supported on a fixed bracket 18.

The carriage is urged in a letter feed direction by a spring drum, not shown, connected to said carriage by a strap 19. A rack 20 supported on the carriage engages a pinion 21 secured to a sleeve 22 freely supported on a shaft 23 rotatably supported in the main frame 10. The sleeve 22 is provided with a flange 24 having a spring pressed pawl 25 pivotally supported thereon and engaging a ratchet 26 connected with an escapement wheel 27 secured to the shaft 23.

The letter spacing of the carriage is effected upon the actuation of any one of a series of key levers 30 about its fulcrum 31; the rear end 29 of each key lever engaging a universal bar 32 to swing upwardly, a frame 33, about pivots 34. The frame 33 has a rearwardly extending arm 35 which is moved downwardly and, through an adjustable screw 36 thereon, actuates a dog rocker 37 through the medium of a tail 38 engaged by said screw.

The dog rocker 37 is pivotally supported by a stud 39 on the main frame 10 and is provided with a fixed dog 40 which is normally out of engagement with the escapement wheel 27 as indicated in Fig. 3. When the dog rocker is actuated, as above described, by the arm 35, it moves in a clockwise direction (Fig. 3) to carry the end of the dog 40 into the path of the teeth 41 of the escapement wheel 27 and releases the loose dog 42 from the escapement wheel to effect the first step in the operation of the escapement mechanism.

To release the loose dog from the escapement wheel, as above stated, the dog rocker 37 is provided with an arm 43 having a slot 44 into which extends a pin 45 from the loose dog so that as the dog rocker is operated it swings the loose dog in a counter clockwise direction about a pivot stud 46 against the action of a spring 47.

The loose dog 42 is carried by a U-shaped frame 48 having arms by which it is pivoted on the escapement shaft 23 which frame, upon the release of the loose dog 42, is swung in a counter clockwise direction (Fig. 3) by the usual printing hammer 50 connected to said frame 48 by a stud 51; the printing hammer being supported on a pivot 52 and operated by a spring 53, to effect the printing, after the loose dog is released from the escapement wheel.

Figure 6:
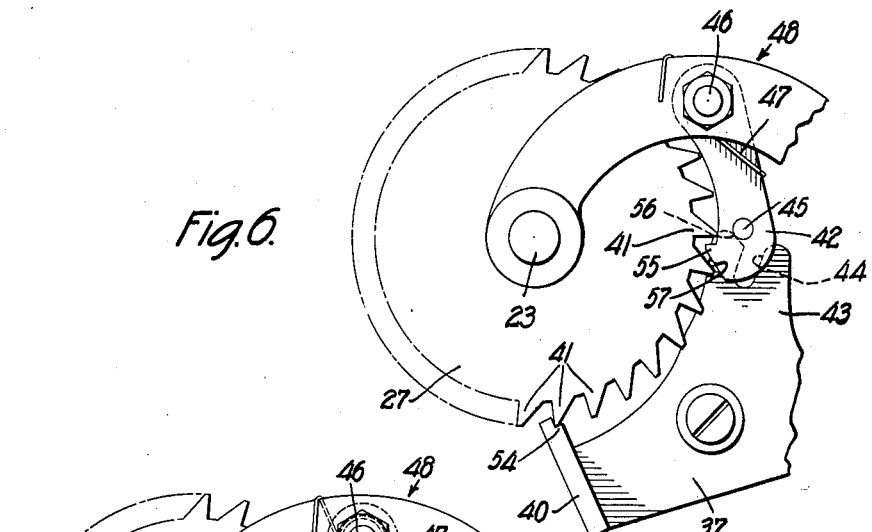
Fig. 6 shows the loose dog entering the path of the next succeeding tooth of the escapement wheel.

By an inspection of Fig. 4 it will be seen that the parts are shown at the instant of release of the loose dog 42 from the escapement wheel. The movement of the dog rocker is subsequently continued until it is arrested by a shoulder 54 on the dog 40 engaging the tooth 41 of the escapement wheel as in Fig. 5. This additional movement causes the loose dog to move out of engagement with the escapement wheel, and it is immediately guided away from the periphery of the escapement wheel by the pin 45 which moves upwardly in the inclined slot 44 thus causing the tooth 55 of the dog 42 to move outwardly and upwardly past the disengaged tooth 41 as indicated in Fig. 5. After the tooth 55 reaches this position the pin 45 emerges from the slot 44 and rides up on an inclined face 56 (Fig. 6) of the arm 43, against which it is held by the spring 47. Thus tooth 55 of the loose dog is guided into the path of the succeeding tooth 41 of the escapement wheel (Fig. 6). To prevent striking the back of the disengaged tooth 41, the dog 42 is cut away at 57. It is obvious in Fig. 6 that the loose dog, in its pivotal movement about the stud 46, is arrested against the outer edge of the tooth 41 of the escapement wheel. It will be understood that while the loose dog is traveling around the disengaged tooth of the escapement wheel the latter is held by the fixed dog 40. It will also be understood that because of the release of the loose dog 42 from the dog rocker or lever 37 it is free to co-operate with the escapement wheel immediately and before the holding dog 40 is disengaged from said escapement wheel. This produces an escapement which is not only more reliable in its operation but is also more speedy.

Figure 7:
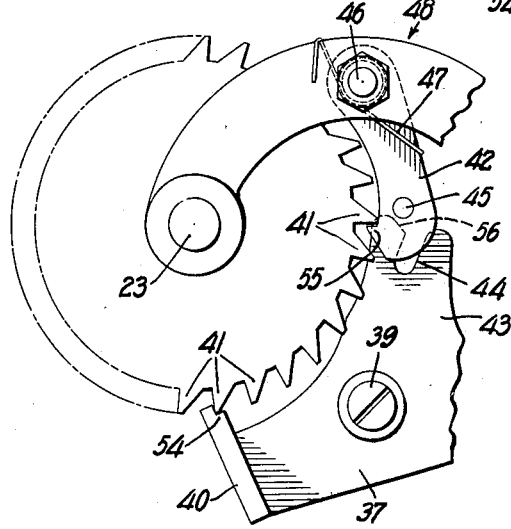
Fig. 7 shows the loose dog nearly in engagement with the tooth succeeding the one from which it has been released and the dog rocker about to return to normal to effect the letter feeding movement of the carriage.

To complete the printing operation of the hammer 50 the parts move from the position in Fig. 6 to the position in Fig. 7 where the parts are arrested, due to contact of the printing hammer with the type, not shown, immediately before the dog tooth 55 reaches the tooth 41.

Upon the return of the key lever 30 to normal a screw 58 on the arms 35 (Fig. 1) engages the tail 38 to return the dog rocker 37 to release the fixed dog 40 from the escapement wheel, whereupon the escapement wheel is rotated, due to its connection with the carriage, to return the loose dog 42, the frame 48 and the connected hammer 50 to normal against the action of the spring 53; the pin 45 of the loose dog finding its way back into the slot 44 of the dog rocker to thus reestablish the proper normal relation between the fixed dog 40 and the escapement wheel. It will be understood that the usual power driven gear 60 (Fig. 3) meshing with a pinion 61 on the shaft 23 may assist in rotating the escapement wheel.

To cause the escapement to function as freely as possible the spring 47 is light and just strong enough, under ordinary conditions, to hold the pin 45 of the loose dog 42 against the cam forming the left side of the slot 44. When, however, the dog rocker has returned to its normal position (Fig. 3) and the loose dog is then returned from the position in Fig. 6, the pin strikes the cam 56 and there is a tendency to swing the dog in a counterclockwise direction. This tendency is great enough to cause the dog 42 to fly out of engagement with the escapement wheel against the action of the spring 47 which is preferably weak for reasons stated above. The disengagement of the dog 42 is overcome, however, by the finger forming the right-hand side of the slot (Fig. 5) with which finger the pin 45 engages to stop the disengagement of said dog.

To arrest the dog carrying frame 48 and thus limit the bodily movement of the loose dog 42 to normal, there is provided an adjustable stop 62 engaged by a collar or cross piece 63 of said U-frame; said stop being adjustably secured to a bracket 64 attached to the machine frame 10 by a screw 65. The stop 62 is located in a plane extending vertically between the two arms 66 and 67 of the frame 48, thus avoiding the twist heretofore experienced in said frame on the escapement shaft when arresting said frame.

Heretofore, in the varityper machine, difficulty has been possible, due to the flat face of the holding dog, and its inclined position which had a caming effect on the active tooth of the escapement wheel, to reversely rotate the escapement wheel varying extents according to the extent of depression of the key levers, which depression is varied in accordance with the blow on the key levers; the inclined position of the dog being desirable to effect a quick return of the dog rocker towards its normal position. This has resulted in reversely feeding the carriage fractions of letter space distance and has thus caused blurring and irregular spacing of the typing on the work sheet, because the hammer, which it will be remembered is released by the dog rocker, would print in whatever position the carriage had been moved to by the camming action of the holding dog.

The possibility of blurring and irregular spacing is entirely eliminated by the stop 54 which limits the extent of overlap of the holding dog 40 with the teeth of the escapement wheel and prevents any camming effect of the holding dog on the escapement wheel.

It should be understood that with my improved escapement mechanism eight parts heretofore necessary have been eliminated; namely, the dog rocker return spring, the separate fixed dog and the two screws heretofore used to attach it to the dog rocker, the two stop screws which limited the dog rocker in its normal and operated positions and the two lock nuts associated with said stop screws. The elimination of these parts not only increases the economy in manufacture but also increases its simplicity and produces a more efficient escapement which is not dependent upon sensitive adjustment for its operation.

It will further be understood that the overlap of the tooth 55 of the loose-dog with the teeth 41 of the escapement wheel is small to keep at a minimum the extent of sliding between said teeth, thus reducing the load on the key-levers and resulting in an increased speed of the machine. It will also be understood that in the escapement used heretofore the slot in the arm 43 of the dog rocker was inclined in the opposite direction to the slot 44. In other words, the slot formerly used was slanted upwardly and leftwardly instead of upwardly and rightwardly, as in Fig. 3, and accordingly effected a sliding movement of the loose-dog on the engaged tooth of the escapement wheel while said dog was returning to normal. This objectionable sliding has been entirely eliminated by the present invention, the pin 45 of the loose-dog entering the slot 44 upon descent of the loose-dog 42.

While certain preferred embodiments of the invention have been shown and described, it will be understood that changes in the form, arrange-

I claim:—

1. In a typewriting machine, the combination with a carriage, of carriage feed mechanism including an escapement wheel, a dog rocker, a fixed dog on said dog rocker, a loose dog, a carrier for said loose dog, means to operatively connect the loose dog with the dog rocker, means to actuate the latter to carry the fixed dog into engagement with the escapement wheel and to release the loose dog from the escapement wheel, means to actuate the dog carrier to carry the loose dog bodily about the periphery of the escapement wheel towards the next succeeding tooth thereon and to disconnect the loose dog from the dog rocker, means to swing the loose dog, after it is disconnected, into the path of said succeeding tooth and while the fixed dog is holding the escapement wheel, and means to return said dog rocker to its normal position independently of the loose dog to disengage the fixed dog from the escapement wheel.

2. In a typewriting machine, the combination with a carriage, of an escapement wheel, a loose dog, a fixed dog, both of said dogs to operate in planes parallel to the escapement wheel, a dog rocker to carry the fixed dog, said dog rocker having a slot therein, a pin on the loose dog to engage in said slot so that the loose dog may be disengaged from the escapement wheel, means to actuate the loose dog bodily after its release, the slot being effective to guide the loose dog away from the escapement wheel while it is being moved bodily, the pin moving out of said slot, an inclined face on the dog rocker to be engaged by after it moves out of said slot, said pin to guide the loose pawl into engagement with the next succeeding tooth of the escapement wheel, and means to hold the pin against said inclined face, said slot being also effective to prevent accidental disengagement of the loose dog from the escapement wheel while said loose dog is returning to normal.

3. In a typewriting machine, the combination of a carriage, an escapement therefor, said escapement including an escapement wheel, a shaft therefor, a U-shaped frame comprising arms joined by a cross-piece, the free ends of said arms being pivoted on the shaft, said frame straddling the escapement wheel, a dog pivotally supported by said frame between the arms thereof and engaging the escapement wheel, a main frame, and an adjustable stop on said main frame to be engaged by the cross piece of the U-frame to limit the motion of said U-frame in one direction.

4. Escapement mechanism for a typewriting machine including an escapement wheel, a normally ineffective holding dog, a feed dog normally in engagement with the escapement wheel, a dog rocker upon which the holding dog is rigid, a pin on said feed dog, said dog rocker having a slot in which the pin engages so that the feed dog may be released from the escapement wheel while the dog rocker is operating to render the holding dog effective, means to advance the feed dog relatively to the escapement wheel and disengage it from said dog-rocker by carrying the pin out of said slot, and means to cause the feed dog to reengage the escapement wheel after its release from said dog-rocker.

5. In a typewriting machine, the combination with a carriage, of escapement mechanism including an escapement wheel connected to be rotated by said carriage, the escapement wheel having teeth on its periphery, a pivoted dog rocker, a holding dog secured to the dog rocker, a pivoted stepping dog, the dog rocker being effective to release the stepping dog from the escapement wheel while the holding dog is being rendered effective, means on the dog rocker to engage the escapement wheel to limit the extent of overlap of the holding dog with the teeth of the escapement wheel and to limit the movement of the stepping dog to its released position, means to advance the stepping dog relatively to the escapement wheel after its release therefrom, means independent of the dog rocker whereby the stepping dog may be swung back into the path of the teeth of the escapement wheel while the dog rocker is at rest, and means on the stepping dog to engage the escapement wheel to limit its extent of overlap with the teeth of the escapement wheel, the stepping dog serving in its normal position to hold the dog rocker in its normal position so that the holding dog carried by the latter is always the same distance from the escapement wheel when returned to normal.

6. In a typewriting machine, the combination with a carriage, of carriage feed mechanism for said carriage, said carriage feed mechanism including a toothed escapement wheel connected with said carriage, a holding dog, a stepping dog, and a dog rocker to actuate said dogs, the holding dog being supported on the dog rocker, a cam on the holding dog to be engaged by the teeth of the escapement wheel to expedite the return of the dog rocker to normal, key levers, a universal bar frame actuable by the key levers to actuate the dog rocker to carry the holding dog into the path of the escapement wheel and to swing the stepping dog out of engagement with said escapement wheel, a shoulder on the holding dog and below said cam to engage the top of the active tooth of the escapement wheel to limit the extent of movement of the latter with respect to said active tooth to present reverse rotation of said escapement wheel by the cam on said holding dog.

7. In a typewriting machine, the combination with a carriage and propelling means therefor, of carriage feed mechanism including a toothed escapement wheel connected with said carriage, a stepping dog, a holding dog, and a dog rocker, the stepping dog, holding dog and dog rocker being disposed to operate in planes extending in the same direction as the plane in which the escapement wheel is disposed, the stepping dog being operable by the dog rocker to disengage it from the escapement wheel, the holding dog being supported by the dog rocker, a pivot for said dog rocker about which it may swing to carry the holding dog radially with respect to the escapement wheel into the path of a tooth of said escapement wheel while the stepping dog is being disengaged, a cam on the holding dog, said cam being angularly disposed with respect to the direction of motion of said holding dog so that the escapement wheel while acting on said cam tends to return said dog rocker to normal, a stop on the holding dog and below said cam to engage the top of the active tooth of the escapement wheel to limit the extent of overlap of said holding dog with the active tooth and thus prevent reverse rotation of the escapement wheel by the holding dog, and means to actuate the dog rocker.

8. In a typewriting machine, the combination with a carriage, of carriage feed mechanism for said carriage, said carriage feed mechanism including a toothed escapement wheel connected with said carriage, a holding dog, a stepping dog, and a dog rocker to actuate said dogs, the holding dog being supported on the dog rocker, a cam on said holding dog to be engaged by the teeth of the escapement wheel one at a time to expedite the return of the dog rocker to normal, key levers, a universal bar frame actuable by the key levers to actuate the dog rocker to carry the holding dog into the path of the escapement wheel and to swing the stepping dog out of engagement with said escapement wheel, and means to cause the holding dog to engage only the outer ends of the teeth of the escapement wheel to thus prevent said holding dog from imparting a fractional reverse rotation to the escapement wheel by the cam while the holding dog is functioning.

FRANK H. TREGO.